(12) United States Patent
Gearing et al.

(10) Patent No.: US 8,819,498 B2
(45) Date of Patent: Aug. 26, 2014

(54) FAULT-BASED UNIT REPLACEMENT

(75) Inventors: Mark John Gearing, Bedfordshire (GB); Stephen John Abbott, Herts (GB); Lee Paul Monahan, Hertfordshire (GB)

(73) Assignee: Xerox Corporation, Norwalk, CT (US)

( * ) Notice: Subject to any disclaimer, the term of this patent is extended or adjusted under 35 U.S.C. 154(b) by 337 days.

(21) Appl. No.: 13/228,546

(22) Filed: Sep. 9, 2011

(65) Prior Publication Data

US 2013/0067266 A1 Mar. 14, 2013

(51) Int. Cl.
*G06F 11/00* (2006.01)

(52) U.S. Cl.
USPC .......................... 714/47.3; 714/47.1; 714/47.2

(58) Field of Classification Search
USPC ...................... 714/47.1, 47.2, 47.3
See application file for complete search history.

(56) References Cited

U.S. PATENT DOCUMENTS

| | | | | |
|---|---|---|---|---|
| 5,596,390 | A * | 1/1997 | Sawada | 399/8 |
| 6,193,426 | B1 | 2/2001 | Guillemin | |
| 6,684,349 | B2 * | 1/2004 | Gullo et al. | 714/47.2 |
| 6,718,285 | B2 | 4/2004 | Schwartz et al. | |
| 6,718,490 | B1 | 4/2004 | Takemoto et al. | |
| 7,123,850 | B1 | 10/2006 | Hamby et al. | |
| 7,127,185 | B2 * | 10/2006 | Doty et al. | 399/24 |
| 7,239,413 | B2 * | 7/2007 | Owen et al. | 358/1.15 |
| 7,509,537 | B1 * | 3/2009 | Jensen et al. | 714/47.2 |
| 7,526,215 | B2 * | 4/2009 | Moodie et al. | 399/24 |
| 7,653,570 | B2 * | 1/2010 | May | 399/107 |
| 7,779,290 | B2 * | 8/2010 | Beekhuis | 714/2 |
| 7,827,018 | B2 * | 11/2010 | Adams et al. | 703/14 |
| 7,831,396 | B2 * | 11/2010 | Voigtlaender et al. | 702/34 |
| 7,992,056 | B2 * | 8/2011 | Takeuchi | 714/48 |
| 8,036,548 | B2 * | 10/2011 | Lee et al. | 399/44 |
| 8,176,367 | B2 * | 5/2012 | Dreifus et al. | 714/47.3 |
| 2004/0080775 | A1 * | 4/2004 | Owen et al. | 358/1.14 |
| 2006/0025967 | A1 * | 2/2006 | Furno et al. | 702/184 |
| 2006/0039708 | A1 * | 2/2006 | Doty et al. | 399/24 |
| 2006/0048019 | A1 | 3/2006 | Takahashi | |
| 2006/0224472 | A1 * | 10/2006 | May | 705/28 |
| 2007/0028061 | A1 * | 2/2007 | Takehana et al. | 711/156 |
| 2008/0059120 | A1 | 3/2008 | Xiao et al. | |
| 2009/0297174 | A1 | 12/2009 | Soures et al. | |
| 2011/0119167 | A1 * | 5/2011 | Bates et al. | 705/34 |

FOREIGN PATENT DOCUMENTS

| | | |
|---|---|---|
| JP | 2004070594 A | 3/2004 |
| JP | 2006007516 A | 1/2006 |

OTHER PUBLICATIONS

United Kingdom Search Report—Patents Act 1977: Search Report under Section 17—for Application No. GB 1215999.2; Claims searched: 1-20; Date of search: Dec. 31, 2012.

\* cited by examiner

*Primary Examiner* — Joshua P Lottich

(74) *Attorney, Agent, or Firm* — Fay Sharpe LLP

(57) ABSTRACT

A method and system are disclosed for determining the end of life condition for a replaceable unit, which may be associated with a multifunction device, and have a useful life expectancy based upon a number of operations. A counter associated with the multifunction device maintains a running count of operations for the unit. Once the number of performed operations of the replaceable unit reaches a given percentage of the expected life of that unit, an analysis is performed on a running history of the fault codes. Once the number of fault codes attributable to any given replaceable unit meets or exceeds a predetermined level, such as a percentage of the running history, a notification is generated indicating a need to replace the replaceable unit.

20 Claims, 5 Drawing Sheets

FAULT-BASED UNIT REPLACEMENT

TECHNICAL FIELD

The presently disclosed embodiments disclosed herein are applicable to methods and systems for determining an end of life condition of a replaceable part as could be used in a number of devices such as, for example, multifunction devices.

BACKGROUND

A multiple-function printer copier machine, i.e., a document printer, copier, scanner, and facsimile (hereinafter "multifunction device"), can perform a number of simultaneous tasks initiated at the device itself, or via a work station and/or routed from a plurality of remote network locations. In some instances, a central multifunction device shared by at least two separate network locations has proven to be an effective asset in office environments to reduce monetary costs associated with setting up individual multifunction devices at each network location, conserve space that would otherwise be used by multiple work stations supporting individual multifunction devices, and save time associated with the individual maintenance of a number of multifunction devices.

Malfunctions in the operations of a multifunction device do, on occasion occur, leading to inconvenience for the users sharing the single multifunction device. For example, when a shared device becomes inoperable due to a malfunction, the various jobs submitted during the downtime must be queued until the malfunction is remedied. Because multifunction devices are appreciated for their achieving rapid delivery times for task commands, the back-up foremost causes frustrations to the persons that are unable to easily identify and correct the malfunction.

In some, but not all circumstances, the aforementioned malfunction is fault-driven, i.e., they are caused by a part in need of repair or replacement. The multifunction device generally includes multiple consumable parts, e.g., duplex document handling rolls, fuser modules, paper feed rolls, ink cartridges, and the like, which are capable of being replaced on site by the typical user. In certain instances, the malfunction may not be immediately remedied, as various internal parts must be repaired or replaced by a visiting technician, in which case costs associated with decreased productivity and lost time are incurred by the entity utilizing such a multifunction device.

In certain instances, a customer of a multifunction device can tinker with the system if a source of the malfunction is easily identifiable and/or accessible, such as, for example, a print media jam in the print media path. Existing multifunction devices oftentimes include step-by-step, illustrated instructions directed toward the manner in which a customer may clear such a jam. There are other instances, however, which specifically require the presence of a certified service engineer at the multifunction device, one whom is particularly skilled in identifying and solving malfunctions. One example of such an instance is for part replacement. Service technicians are specially trained in removal of expired, faulty, and irreparable parts for replacement with new parts. Unfortunately, the identification of the part requiring replacement may not be ascertainable until such time as the service technician has physical access to the multifunction device. Once identified, the service technician may exacerbate the downtime by not having a replacement part readily at hand.

INCORPORATION BY REFERENCE

The following references, the disclosures of which are incorporated herein by reference in their entireties, are mentioned:

1. Eric S. Hamby, et al., U.S. Pat. No. 7,123,850, issued Oct. 17, 2006, entitled CONTROL SYSTEM AND METHOD FOR MIITGATING TRANSIENTS IN A MACHINE DUE TO OCCASIONAL MAINTENANCE OR SERVICE.

2. Michael N. Soures, et al., U.S. Ser. No. 12/472,593, filed May 27, 2009, entitled CUSTOMER PART REPLACEMENT FEATURE UTILIZING HIGH FREQUENCY SERVICE INTERVAL FAULT AND SIGNATURE ANALYSES.

3. Fei Xiao, et al., U.S. Ser. No. 11/468,443, filed Aug. 30, 2006, entitled USING FAULT HISTORY TO PREDICT REPLACEMENT PARTS.

BRIEF DESCRIPTION

In accordance with aspects of the embodiments described herein, there is provided a method for determining an end of life condition for one or more replaceable units in a multifunction device, which includes initiating, with a processor, an operations counter associated with the replaceable unit to generate a corresponding number of operations of the unit. The method also includes storing, in an associated memory, fault code occurrences generated by the multifunction device, and calculating a rate of fault code occurrences for the replaceable unit. The method further provides for determining the existence of an end of life condition for the replaceable unit based upon the number of operations and the rate of the fault code occurrences for the replaceable unit. In addition, the method provides for the generating of a notification that indicates the end of life condition of the replaceable unit.

In accordance with aspects of the embodiments described herein, there is provided a replaceable unit end of life determination system that includes a processor, a counter that is configured to generate a number of operations associated with the replaceable unit, a fault code generator that is operative to generate a number of fault codes generated during operations of an associated multifunction device, and memory that stores fault code definitions, the number of generated fault codes, and an output of the counter corresponding to the replaceable unit. The memory of the system is in communication with the processor, which stores instructions which are executed by the processor for calculating a rate of fault code occurrences generated by the fault code generator corresponding to the replaceable unit, and comparing the number of operations for the replaceable unit to a preselected operations threshold. The instructions are also for comparing the calculated rate of fault code occurrences to a preselected fault code threshold in response to the results of the comparison of the number of operations to the preselected operations threshold, and for determining an end of life condition for the replaceable unit in response to the results of the comparison of the calculated rate of fault code occurrences to the preselected fault code threshold. The instructions are also for generating a notification indicative of the end of life condition of the replaceable unit.

In accordance with aspects of the embodiments described herein, there is provided a computer-implemented method for determining an end of life condition for at least one replaceable unit of an associated multifunction device that includes initiating, with a processor an operations counter associated with the at least one replaceable unit to generate a number of operations for the unit. The method also includes storing, in an associated memory, fault code occurrences generated by the multifunction device, and calculating a rate of fault code occurrences for the at least one replaceable unit in a running history of stored fault codes. The method further includes comparing the number of operations for the at least one replaceable unit to a preselected operations threshold, and comparing the calculated rate of fault code occurrences to a preselected fault code threshold based upon an output of the comparison of the number of operations to the preselected operations threshold. In addition, the method includes determining an end of life condition for the at least one replaceable unit in response to the comparison of the calculated rate of fault code occurrences to the preselected fault code threshold, and generating a notification that indicates the end of life condition for the at least one replaceable unit.

BRIEF DESCRIPTION OF THE DRAWINGS

The present disclosure may take form in certain parts and arrangements of parts, several embodiments of which will be described in detail in this specification and illustrated in the accompanying drawings which form a part hereof and wherein.

DETAILED DESCRIPTION

Figure 1:
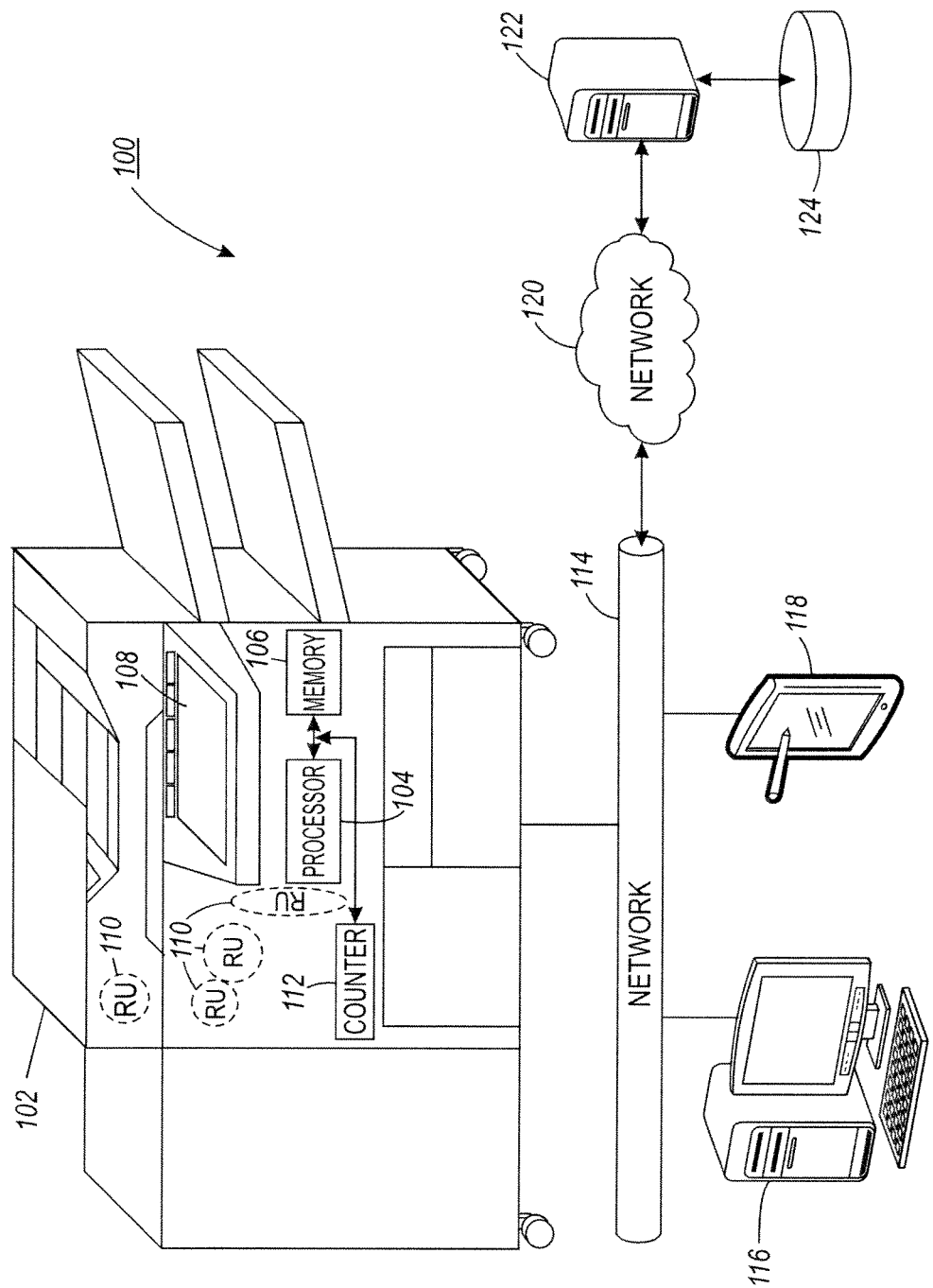
FIG. 1 illustrates a system capable of implementing the systems and methods for determining an end of life condition for a replaceable unit in accordance with one embodiment of the subject application.

One or more implementations of the subject application will now be described with reference to the attached drawings, wherein like reference numerals are used to refer to like elements throughout.

The embodiments described herein relate generally to a system and method for an accurate and reliable mechanism for use with a multifunction device which provides customers with routine capabilities to self-service the multifunction device when at least one expired or faulty replaceable unit is identified by the routine as needing replacement. Although the system finds particular application in multifunction devices, it will be appreciated that selected aspects may find application in related areas encountering issues of predicting at least one replaceable unit needing replacement.

The aforementioned replaceable units may be located within or associated with a multifunction device, and have a useful life expectancy based upon a number of operations, cycles, feeds, prints, or the like. An end of life condition may occur prematurely, i.e., prior to the expiration of the useful life expectancy. A counter associated with the multifunction device maintains a running count of operations associated with each replaceable unit, e.g., rollers, fuser modules, feed modules, etc. Once the number of performed operations of the replaceable unit reaches a given percentage of the expected life of that unit, an analysis is performed on a running history of the fault codes. Once the number of fault codes attributable to any given replaceable unit meet or exceed a predetermined level (e.g., a percentage of the running history), an alert or notification is generated indicating a need to replace the replaceable unit. This notification may arrive prematurely with respect to the expected life expectancy of the unit, or coincident therewith.

Turning now to FIG. 1, there is shown an example system 100 that may be used for determining an end of life condition for at least one replaceable unit in a multifunction device in accordance with the example embodiments described herein.

It will be appreciated that the various components depicted in FIG. 1 are for purposes of illustrating aspects of the subject application, and that other similar components, implemented via hardware, software, or a combination thereof, are capable of being substituted therein. The system 100 includes a multifunction device 102, which is representative of any computing system that comprises at least a processor 104 (described in greater detail as the processor 302 of FIG. 3) that executes, and a memory 106 (described in greater detail below as the memory 304 of FIG. 3) that stores computer-executable instructions for providing the various functions, calculations, selections, and the like, described herein. It will be appreciated that the multifunction device 102, is suitably adapted to perform a variety of document processing operations, including, for example and without limitation, scanning, copying, facsimile transmissions, printing, electronic mail communications, document management, document storage, or the like.

In accordance with one embodiment of the subject application, the multifunction device 102 is capable of being employed as one possible hardware configuration to support the systems and methods described herein. The skilled artisan will further appreciate that although the multifunction device 102 is illustrated as a standalone document processing device, any suitable computing environment is capable of being employed in accordance with the subject application. For example, computing architectures including, but not limited to, multiprocessor, distributed, client/server, tablet, mainframe, supercomputer, digital and analog can be employed in accordance with the one embodiment of the subject application. It will further be appreciated that the multifunction device 102 may include a computer server, workstation, personal computer, combination thereof, or any other computing device.

The multifunction device 102 can include a processing unit 104 (see, e.g. FIG. 3), a system memory 106 (see, e.g. FIG. 3), and a system bus (such as the bus 312 of FIG. 3) that couples various system components including the system memory 106 to the processing unit 104. The processing unit 104 can be any of various commercially available processors. The processing unit 104 can be variously embodied, such as by a single-core processor, a dual-core processor (or more generally by a multiple-core processor), a digital processor and cooperating math coprocessor, a digital controller, or the like. The processing unit 104, in addition to controlling the operation of the multifunction device 102, executes instructions stored in memory 106 for performing the methods outlined in FIG. 2, as described more fully below.

The term "software," as used herein, is intended to encompass any collection or set of instructions executable by a computer or other digital system so as to configure the computer or other digital system to perform the task that is the intent of the software. The term "software" as used herein is also intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

The multifunction device 102 typically includes at least some form of computer readable media. Computer readable media can be any available media that can be accessed by the multifunction device 102. For example, and without limitation, computer readable media may comprise computer storage media and communication media. Computer storage media includes volatile and nonvolatile, removable and non-removable media implemented in any method or technology for storage of information such as computer readable instructions, data structures, program modules or other data.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. Communication media includes, for example, and without limitation, BLUETOOTH, WiMax, 802.11a, 802.11b, 802.11g, 802.11(x), a proprietary communications channel, infrared, optical, the public switched telephone network, or any suitable wireless data transmission system, or wired communications known in the art. Combinations of any of the above can also be included within the scope of computer readable media.

A user may enter commands and information into the computer through an input device 108 (see, e.g. FIG. 3) such as a touch-screen interface, a keyboard, a pointing device such as a mouse or stylus, a speaker for audible alerts, a microphone for voice input, or a graphical tablet. The multifunction device 102 is capable of operating in a networked environment using logical and/or physical connections to one or more remote computers, such as a remote computer(s), depicted as the network 114 of FIG. 1. The logical connections depicted include a local area network (LAN) and a wide area network (WAN). Such networking environments are commonplace in offices, enterprise-wide computer networks, intranets and the Internet 120.

As illustrated in FIG. 1, the system 100 also includes one or more replaceable units 110, depicted in FIG. 1 as "RU" 110 associated with the multifunction device 102. According to various embodiments of the subject application, the replaceable units 110 are representative of any components of the multifunction device 102 that have a predefined life expectancy, e.g., hardware, software or a combination thereof. That is, the replaceable units 110 correspond to components of the multifunction device 102 that may include high-frequency service items that are perishable/consumable, such as, for example and without limitation, fuser modules, toner cartridges, developing rollers, duplex rollers, document handling rollers, feed rollers, and the like. It will be appreciated that such replaceable units 110 may be replaceable by an associated user, the customer, service technicians, manufacturer representatives, or the like.

It will further be appreciated that the memory 106 is capable of storing data representative of a plurality of end of life conditions, life expectancies, and the other information corresponding to each replaceable unit 110 operatively coupled to the multifunction device 102. That is, the memory 106 is configured to store information related to a maximum (expected) number of operations capable of being performed by a replaceable unit 110. For example, the memory 106 may store information that designates a feed roller (replaceable unit 110) has a life expectancy of performing 150,000 document feeds before failure is imminent and/or replacement is warranted. Similarly, the memory 106 may store information indicating that a fuser module (replaceable unit 110) has a life expectancy of 20,000 cycles before failure is imminent and/or replacement is warranted. It will further be appreciated that the memory 106 may further store a plurality of life expectancy threshold values, which are indicative of replacement of the replaceable units 110, as explained in greater detail below.

In addition, the system 100 includes a counter unit 112 (described in greater detail below as the counter component 322 of FIG. 3). According to one embodiment of the subject application, the counter unit 112 is initiated so as to maintain a running count of operations performed by a given replaceable unit 110, e.g., the number of cycles performed by a fuser module, the number of feeds performed by a feed roller, the number of prints output by a toner cartridge, and the like. In such an embodiment, the counter 112 is in data communication with the processor 104 and memory 106 such that data corresponding to the count associated with each replaceable unit 110 tracked by the counter 112 is stored in the memory 106 for later analysis, as set forth below. Thus, when an operation is performed by the multifunction device 102, the counter 112 increments the running total of operations associated with whichever replaceable unit(s) 110 is/are involved in such an operation. It will be appreciated that while a single counter 112 is illustrated and referenced herein, each replaceable unit 110 may have an individual counter associated therewith. It will further be appreciated that the counter 112 may be hardware, software, or a combination thereof that is operatively coupled to, or a component of, the processor 104 and memory 106, such that operations of the processor 104 in conjunction with the memory 106 facilitate counting of replaceable unit operations as set forth herein. Additional functioning of the multifunction device 102 is discussed in greater detail below with respect to the example multifunction device system 300 of FIG. 3.

As discussed briefly above, the multifunction device 102 is in data communication with a computer network 114. As depicted in FIG. 1, user devices 116 and 118 are also in data communication with the computer network 114, and are capable of sending and receiving communications thereon to and from the multifunction device 102. In accordance with one embodiment of the subject implementation, the user devices 116 and 118 are capable of receiving alerts or notifications from the processor 104 or other suitable component associated with the multifunction device 102 representative of the status of one or more components, replaceable units 110, operations, outputs of the counter 112, or the like. In the example implementation illustrated in FIG. 1, the user devices 116 and 118 receive notifications concerning the replaceable units 110 of the multifunction device 102 indicative of a need to order a new unit, replace the unit 110, status of the unit 110, and any other suitable information related thereto.

It will be appreciated that while illustrated in FIG. 1 as a personal computer 116 and a smart phone 118, the user devices 116 and 118 are representative of any personal computing devices known in the art capable of receiving notifications, e.g., electronic mail, screen alerts, text messages, voice messages, pop-up windows, and the like. It will be understood that any suitable device includes appropriate memory and an associated processor for controlling interactions between the devices 116 and 118 and any other devices coupled to the network 114.

In one example embodiment, the network 114 is in communication with an external wide area network 120, such as, for example and without limitation, the Internet. Via the connection to the external network 120, the multifunction device 102 may be in communication with the server 122. According to such an example embodiment, the server 122 is associated with a service provider, technician, supplier, or the like. It will be appreciated that the subject application enables, according to such an embodiment, the automatic reporting of the determined end of life of a replaceable unit 110 to the server 122, for ordering of a replacement, scheduling of a service call, and the like. It will further be appreciated that such an automatic implementation includes the communication of the need for a replacement to the operator of the multifunction device 102, an administrator or user via user devices 116 or 118, the service provider or supplier via server 122, and the like. The server 122 may be operatively connected to a data storage device 124. According to one embodiment, the data storage device 124 is any mass storage device known in the art including, for example and without limitation, magnetic storage drives, a hard disk drive, optical storage devices, flash memory devices, or any suitable combination thereof. In such embodiments, the data storage device 124 may store account information relating to the multifunction device 102, information related to the replacement units 110, inventory levels, customer data, schedules, contact information for suppliers and/or technicians, or myriad other types of information related to the replacement of replaceable units 110 associated with the multifunction device 102. It will be appreciated that while illustrated in FIG. 1 as being a separate component of the system 100, the data storage device 124 is capable of being implemented as an internal storage component of the server 122, such as, for example and without limitation, an internal hard disk drive, or the like.

It will be appreciated that the server 122 may include any hardware, software, or combinations thereof, capable of implementing the systems and methods described herein. Suitable examples of such hardware includes, for example and without limitation, processors, hard disk drives, volatile and nonvolatile memory, a system bus, user interface components, display components, and the like. It will further be appreciated that multiple such devices may be used as the server 122 in accordance with the subject application.

Figure 2A:
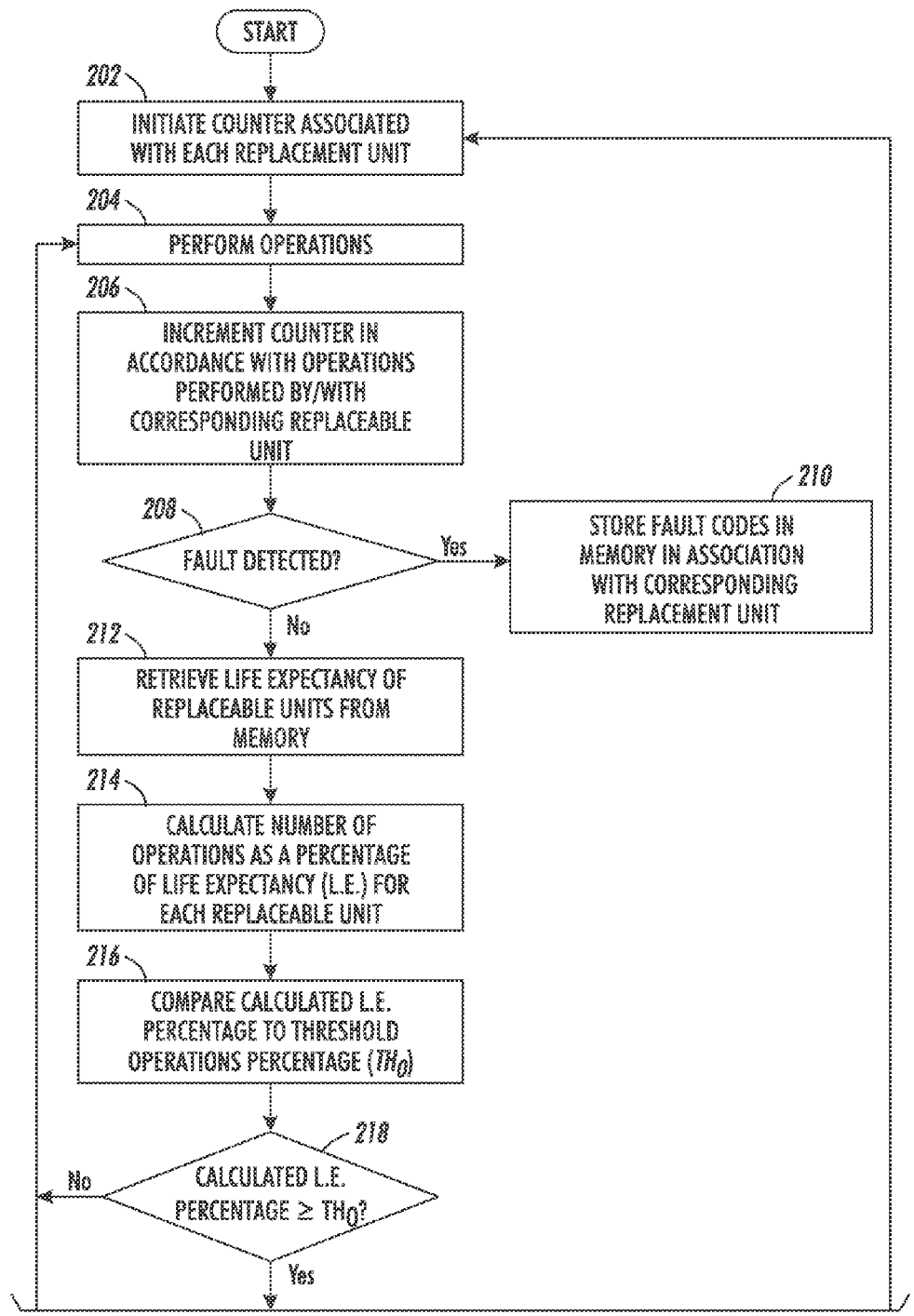
FIG. 2A illustrates an example methodology for determining an end of life condition of a replaceable unit in accordance with one embodiment of the subject application.
Figure 2B:
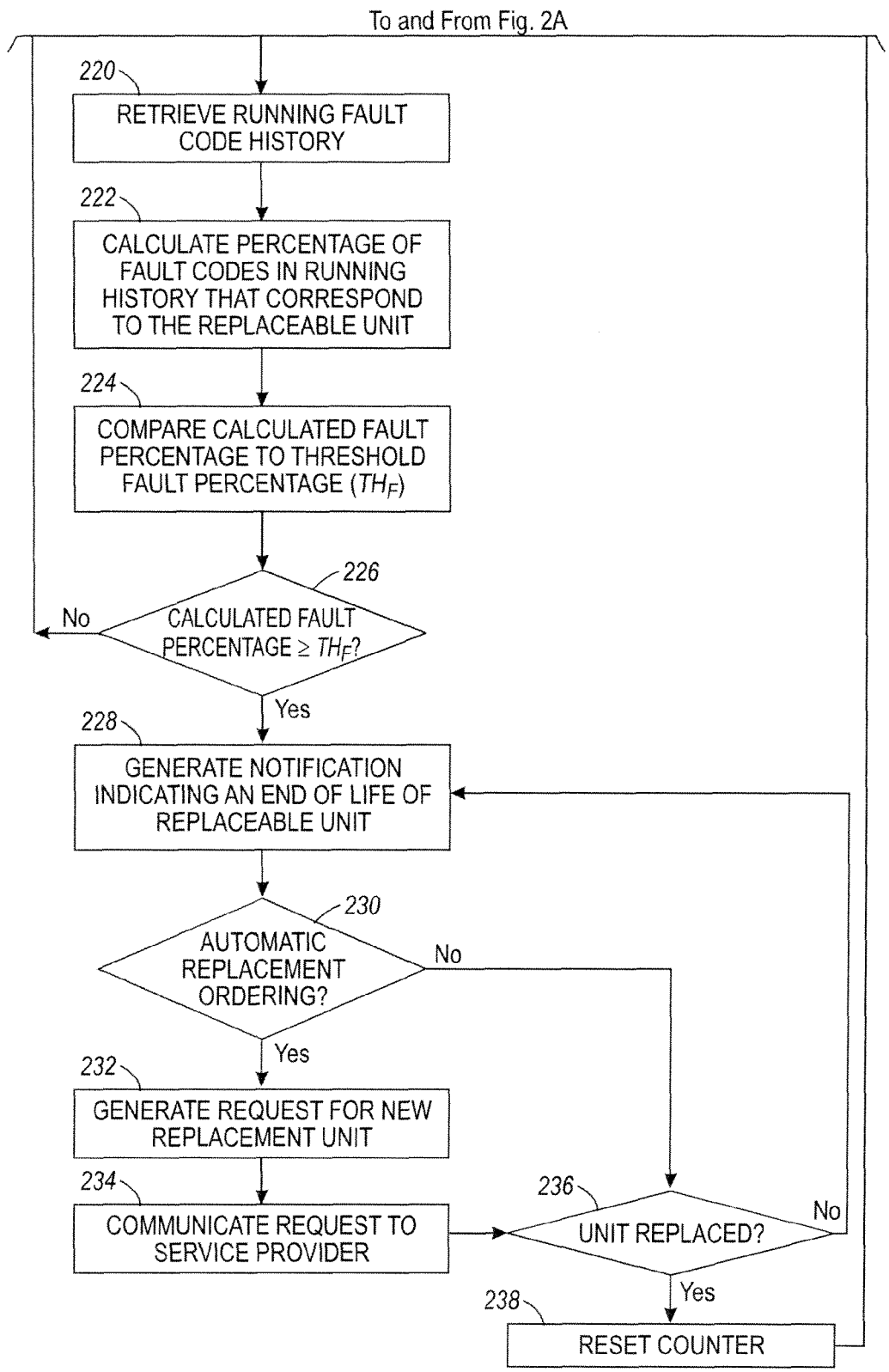
FIG. 2B illustrates an example methodology in conjunction with FIG. 2A for determining an end of life condition of a replaceable unit in accordance with one embodiment of the subject application.

Turning now to FIGS. 2A and 2B, there is depicted a flowchart 200 illustrating one example embodiment of the subject application, described hereinafter using the various components of FIG. 1. It will be appreciated that the components of FIG. 1 are used hereinafter for purposes of explaining one implementation of the subject application. Various other components, as will be appreciated, are also capable of being used and implemented to perform the methods described hereinafter. For example, while reference is made hereinafter to replaceable units 110 associated with a multifunction device 102, any device having replaceable parts is capable of implementing the systems and methods described herein, e.g., industrial production machines, assembly lines, and the like.

The methodology 200 of FIGS. 2A and 2B may begin at 202, whereupon a counter (e.g., the counter 112 associated with the multifunction device 102) is initiated for each replaceable unit 110. According to one embodiment, the counter 112 is operatively connected to the various replaceable units 110 associated with the multifunction device 102. Operations associated with the multifunction device 102 are performed at 204 that involve the use of one or more replaceable units 110. For example, a copying operation performed by the multifunction device 102 may involve a document handler feed roller replaceable unit 110, a fuser module replaceable unit, a toner cartridge replaceable unit 110, and the like. In such instances, the counter 112 associated with the replaceable units 110 used in the performance of the operation is incremented accordingly at 206.

A determination is then made at 208 whether any fault is detected. It will be appreciated that operations of the multifunction device 102 are continually monitored by various components associated therewith, including, for example and without limitation, the processor 104, sensors (not shown), or the like. In the event that a fault occurs, e.g., an error such as paper jam, misprint, miss-feed, error in fusing, or the like, a corresponding fault code is generated and logged into memory 106. Thus, when a fault is detected at 208, the fault codes associated with the detected fault are stored at 210 in memory 106 in association with the replaceable unit 110 (if any) to which the fault code corresponds. It will be appreciated that the fault codes may be, for example and without limitation, alpha-numeric sequences of predetermined lengths that correlate to a particular fault detected, e.g., low toner, out of paper, paper jam at feed roller, paper jam at fuser, or the like. In accordance with one embodiment of the subject application, the memory 106 facilitates storage of a running history of fault codes, such that a predetermined number of past fault codes is termed the running history, e.g., the last 30, 40, 50, or 100 faults are used as a running history of codes, as may be used in embodiments of the subject application.

After storage of the detected fault in memory 106, or upon a determination that no faults were detected, operations proceed to 212, whereupon the life expectancy of the replaceable units 110 is retrieved from memory 106. According to one embodiment, the life expectancy of each replaceable unit 110 may reflect the expected number of sheets that are to be fed by a roller before failure of the roller, the expected number of cycles to be performed by a fuser before failure of the fusing module, the expected number of printed materials to be output using a toner cartridge before the cartridge is empty, or the expected number of operations of a component of the multifunction device 102 before that component fails. The processor 104 or other suitable component associated with the multifunction device 102 calculates, at 214, the number of operations of a replaceable unit 110 as a percentage of the life expectancy corresponding to that unit 110. That is, the processor 104 determines, based upon the number of operations counted by the counter 112, a percentage of the life expectancy that has already been used by the associated replaceable unit 110.

The calculated life expectancy percentage is then compared to a threshold operations percentage ($Th_O$) at 216. The threshold ($Th_O$) is representative of a predetermined number of operations, i.e., all or a portion of the life expectancy, associated with each individual replaceable unit 110. It will be appreciated that the replaceable units 110 may have different life expectancies, i.e., number of cycles, number of feeds, and the like. According to one embodiment of the subject application, the threshold ($Th_O$) corresponds to a predetermined number of completed operations, such that meeting or exceeding the threshold ($Th_O$) indicates that replacement of the corresponding replaceable unit 110 is warranted, imminent, past due, or the like, depending upon the settings of the multifunction device 102, manufacturer settings, aftermarket replacement part settings, customer or administrator defined settings, or the like.

It will be appreciated that the threshold operations percentage ($Th_O$) may be designated as 50% of the life expectancy, 60% of the life expectancy, 75% of the life expectancy, 80% of the life expectancy, 100% of the life expectancy, or any other percentage thereof, as determined in accordance with the particular replaceable unit to which the particular ($Th_O$) corresponds. For example, the life expectancy of a feed roller replaceable unit 110 may be 150,000 feeds, thus the threshold operations percentage ($Th_O$) may be 50% (75,000 feeds), 60% (90,000 feeds), 75% (112,500 feeds), etc. As an additional example, a fusing unit may have a life expectancy of 100,000 cycles, wherein setting the threshold operations percentage ($Th_O$) would result in 50% (50,000 cycles), 60% (60,000 cycles), 75% (75,000 cycles), 80% (80,000 cycles), etc. The percentage ($Th_O$) may be different for different replaceable units 110, e.g., 60% for a feed roller replaceable unit 110, and 80% for a fuser module replaceable unit 110.

A determination is then made at 218 whether the calculated life expectancy percentage is greater than or equal to the threshold operations percentage ($Th_O$). That is, the processor 104 or other suitable component associated with the multifunction device 102 determines whether the number of operations already performed by the replaceable unit 110, as a percentage, has met or exceeded the threshold percentage, e.g., the calculated percentage is 65% and the threshold percentage ($Th_O$) is 60%. In the event that the calculated percentage is less than the threshold percentage ($Th_O$), the methodology 200 of FIG. 2 returns to 204 and additional operations are performed by the multifunction device 102 as set forth above.

Upon a determination at 218 that the calculated percentage is greater than or equal to the threshold operations percentage ($Th_O$), the running fault code history is retrieved from the memory 106 for analysis. In accordance with one embodiment of the subject application, the running fault code history is representative of a selected past number of fault codes registered and stored by the multifunction device 102. It will be appreciated that any desired number of fault or error codes may be designated as the running history, including, for example and without limitation, the most recent 40 codes, the most recent 50 codes, the most recent 75 codes, the most recent 100 codes, the codes received since last start up, the codes received in a selected period of time, or the like.

The processor 104 or other suitable component associated with the multifunction device 102 then calculates a percentage of the fault codes in the running history that corresponds to each particular replaceable unit 110 that has met or exceeded the threshold ($Th_O$) at 222. The calculated fault percentage is then compared to a predetermined fault percentage threshold ($Th_F$) at 224. In accordance with one embodiment, the threshold ($Th_F$) is representative of a predetermined percentage of faults or errors indicative of replacement of the individual replaceable unit 110. According to such an embodiment, the threshold ($Th_F$) is set as a percentage of the running history of fault codes, i.e., the last X number of faults that were recorded by the multifunction device 102 and stored in memory 106.

It will be appreciated that the threshold fault percentage ($Th_F$) may be designated as 2% of the stored codes, 5% of the stored codes, 8% of the stored codes, 12% of the stored codes, 20% of the stored codes, or any other percentage thereof, as determined in accordance with the particular replaceable unit 110 to which the threshold ($Th_F$) corresponds. For example, one embodiment of the application may set the running history (number of stored codes) at 40, such that the threshold percentage ($Th_F$) is set at 20%, i.e., the corresponding number of faults is 8 of the 40 stored codes correspond to the particular replaceable unit 110 that has met or exceeded its operations threshold ($Th_O$). The percentage ($Th_F$) may be different for different replaceable units 110, e.g., 2% of the running history for a fusing module replaceable unit 110, but 15-20% for a feed roller replaceable unit 110.

The calculated fault percentage corresponding to the replaceable unit 110 is then compared to the threshold fault percentage ($Th_F$) corresponding to that unit at 226. That is, a determination is made whether the number of faults attributable to the particular unit 110 as a percentage of the running history meets or exceeds a threshold percentage of the faults ($Th_F$). When the calculated fault percentage does not exceed the corresponding threshold fault percentage ($Th_F$) for that particular replaceable unit 110, flow returns to 204, whereupon the multifunction device 102 performs operations as set forth above.

When it is determined that the calculated fault percentage is greater than or equal to the threshold fault percentage ($Th_F$), a notification is generated indicating the end of life condition of the corresponding replaceable unit 110 at 228. It will be appreciated that the determined end of life condition may be premature, i.e., the life expectancy indicates life still available, however the resulting fault percentage indicate failing of the replaceable unit 110, or that the end of life condition is in alignment with the predetermined life expectancy, i.e., the life expectancy indicates no life should be available and the fault percentage is in alignment thereof.

Figure 3:
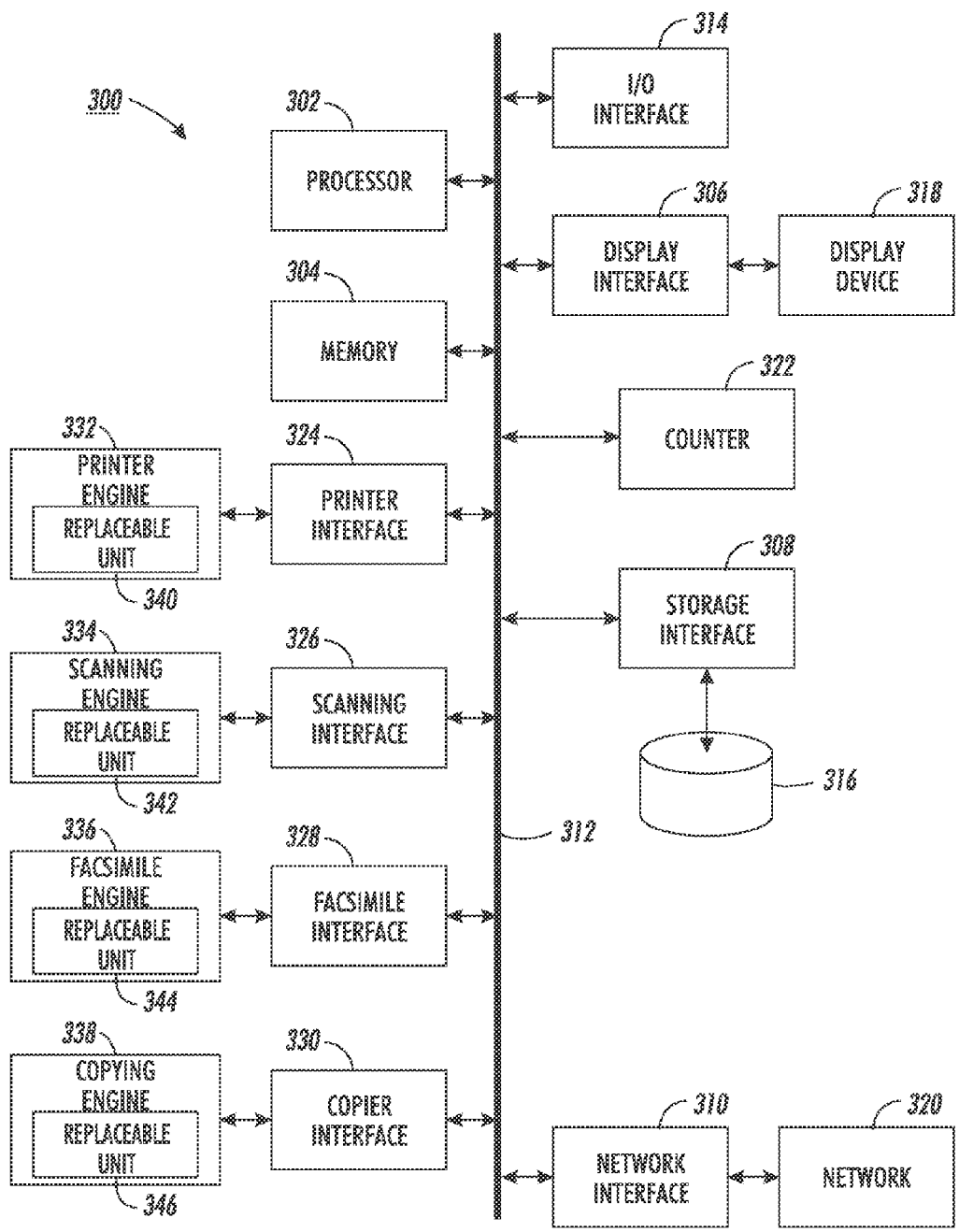
FIG. 3 illustrates a multifunction device system that is capable of implementation to facilitate determining an end of life condition for a replaceable unit in accordance with one embodiment of the subject application.

The notification generated 228 may be generated via the processor 104, via any other suitable components associated with the multifunction device 102, as illustrated in FIG. 3 discussed in greater detail below. According to embodiments of the subject application, the notification may be any suitable notification to a user, administrator, supplier, service technician, or the like, including, for example and without limitation, and audible alert, a message via the user interface 108, an electronic mail message to the user device 116 or 118, a text message to the user device 116 or 118, an electronic communication to the server 122, a popup displayed via the user interface 108 or the user device 116 or 118, or the like.

A determination is made at 230 whether automatic ordering of a corresponding replacement for the replaceable unit 110 has been enabled. That is, the processor 104 or other suitable component associated with the multifunction device 102 determines whether a communication should be sent to the supplier, e.g., the service provider of the server 122, requesting a new unit to replace the replaceable unit 110 that has been determined to be in an end of life state. When such a determination is positive, the processor 104 or other component of the multifunction device 102 generates a request (order) at 232 for a new replaceable unit 110. It will be appreciated that while referenced as originating from the multifunction device 102, the order is capable of originating from the user devices 116 or 118, or automatically via the server 122, e.g., configured to automatically replace upon device setup. The request for the new unit is then communicated via the network 114, the Internet 120, etc., to the server 122 associated with the service provider at 234.

In the event that automatic replacement ordering is not enabled or following communication of the request for a replacement, operations proceed to 236, whereupon a determination is made whether the replaceable unit 110 has been replaced. In the event that the replaceable unit 110 has been replaced, the counter 112 is reset at 238 and operations return to 202, whereupon the counter 112 associated with the replaced replaceable unit 110 is initiated for operations by the processor 104 or other suitable component associated with the multifunction device 102. In the event that the unit 110 has not been replaced at 238, operations return to 228, whereupon notification is generated indicating the end of life of the unit 110, as explained in greater detail above.

Turning now to FIG. 3, illustrated is a representative multifunction device 300 (depicted in FIG. 1 as the multifunction device 102) that facilitates determining an end of life condition for a replaceable unit in accordance with one embodiment of the subject application. The multifunction device 300 includes a processor unit 302 which is advantageously placed in data communication with memory 304, which may include, for example and without limitation, non-volatile read only memory, volatile read only memory, random access memory or a combination thereof, a display interface 306, a storage interface 308, and a network interface 310. In one embodiment, interfacing with the foregoing modules is suitably accomplished via a bus 312. The processor 302 executes, and the memory 304 stores computer-executable instructions for performing the various functions, methods, steps, techniques, and the like, described herein. The processor 302 and memory 304 may be integral to each other or remote but operably coupled to each other.

The memory 304 suitably includes firmware, such as static data or fixed instructions, such as BIOS, system functions, configuration data, and other routines used for operation of the computer system 300 via the processor 302. The memory 304 is further capable of providing a storage area for data and instructions associated with applications and data handling accomplished by the processor 302.

The display interface 306 receives data or instructions from other components on the bus 312, which data is specific to generating a display to facilitate a user interface. The display interface 306 suitably provides output to a display device 318, suitably a video display such as a monitor, LCD, plasma, or any other suitable visual output device as will be appreciated by one of ordinary skill in the art.

As will be appreciated, the storage interface 308 is configured to provide a mechanism for non-volatile, bulk or long term storage of data, fault codes, operational information, or instructions in the computer system 300. The storage interface 308 suitably uses a storage component, such as storage 316, suitably comprised of a disk, tape, CD, DVD, or other relatively higher capacity addressable or serial storage medium.

The network interface 310 suitably comprises a network interface card, a wireless network interface, or the like. It will be appreciated that by one of ordinary skill in the art that a suitable network interface is comprised of both physical and protocol layers and is suitably any wired system, such as Ethernet, token ring, or any other wide area or local area network communication system, or wireless system, such as Wi-Fi, WiMax, or any other suitable wireless network system, as will be appreciated by one of ordinary skill in the art. In the illustration of FIG. 3, the network interface 310 is connected to a physical network 320, suitably comprised of a local area network, wide area network, or a combination thereof.

An input/output interface 314 in data communication with the bus 312 is suitably connected with input devices, such as a keyboard, mouse, pointing device, touch screen inputs, or the like. In addition, the input/output interface 314 is further capable of data input and output to or from a peripheral interface, such as a USB, universal serial bus output, SCSI, IEEE 1394 output, or any other interface as may be appropriate for a selected application. Also in data communication with the bus 312 are interfaces to one or more document processing engines. As illustrated in FIG. 3, the multifunction device 300 includes a printer interface 324, a scanner interface 326, a facsimile interface 328, and a copier interface 330. According to one embodiment of the subject application, the preceding interfaces 324-330 facilitate respective communication with a printer engine 332, a scanning engine 334, a facsimile engine 336, and a copier engine 338. It is to be appreciated that the multifunction device 300 suitably accomplishes one or more document processing functions.

It will be appreciated that the print engine 332 suitably enables the output of physical documents representing an electronic document communicated to the multifunction device 300. It will also be appreciated that the scanning engine 334 is suitably adapted to receive hard copy documents and generate electronic image data therefrom. According to certain embodiments of the subject application, the scanning engine 334 is capable of generating such image data from tangible documents in a variety of forms, including, for example and without limitation, bitmapped data, vector data, page description language formatted data, and the like. It will further be appreciated that optical character recognition is also capable of being performed via functioning of the scanning engine 334. The copier engine 338 is suitably adapted to operate in conjunction with the scanning engine 334 and the printer engine 332 so as to generate tangible copies of input documents, as will be appreciated by those skilled in the art. In accordance with one embodiment, the facsimile engine 336 communicates to or from external facsimile devices (not shown).

The multifunction device 300 also includes a counter 322 in data communication with the bus 312 and thereby the various interfaces 324-330 discussed above. The counter 322 is suitable configured to interact with various replaceable units 340-346 associated with the corresponding engines 332-338. In accordance with one embodiment, the counter 322 maintains counts of operations associated with the replaceable units 340-346 and stores the same in then storage 316 via the storage interface 308.

Figure 4:
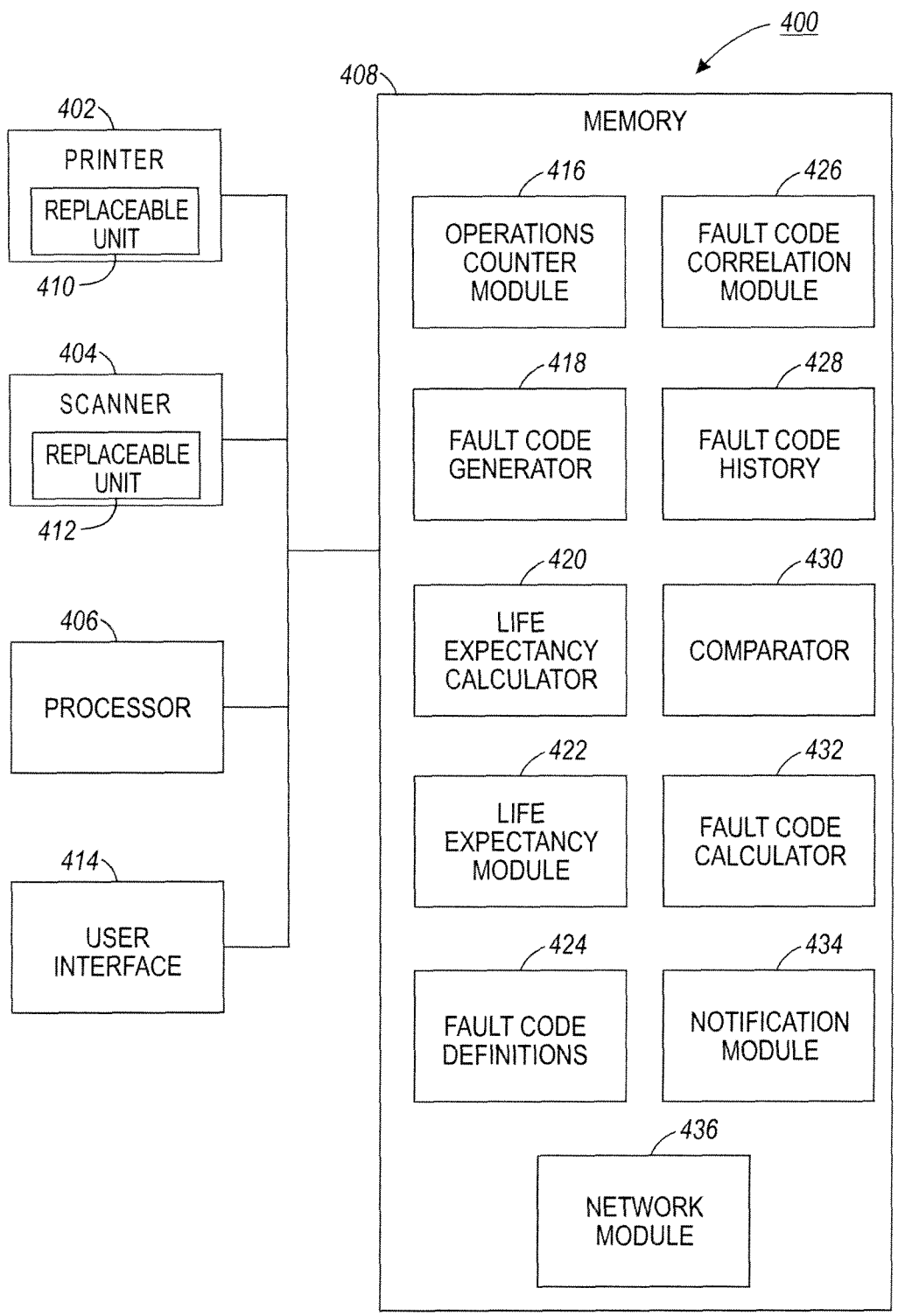
FIG. 4 illustrates a system that facilitates end of life determinations of a replaceable unit in accordance with one embodiment of the subject application.

FIG. 4 illustrates a system 400 that facilitates end of life determinations of a replaceable unit in accordance with one embodiment of the subject application. The system comprises a print engine 402 and a scanning engine 404 that are coupled to a processor 406 that executes, and a memory 408 that stores computer-executable instructions for performing the various functions, methods, techniques, steps, and the like described herein. The processor 406 and memory 408 may be integral to each other or remote but operably coupled to each other. In another embodiment, the scanner 404, the processor 406, and memory 408 are integral to the printer 402. In another embodiment, the processor 406 and memory 408 reside in a single computing device that is operably coupled to the printer 402 and the scanner 404.

According to one embodiment of the subject application, the system 400 comprises the processor 406 that executes, and the memory 408 that stores one or more computer-executable modules (e.g. programs, computer-executable instructions, etc.) for performing the various functions, methods, procedures, etc., described herein. Additionally, "module," as used herein, denotes application specific hardware, a set of computer-executable instructions, software code, program, routine, or other computer-executable means for performing the described function, or a suitable combination thereof, as will be understood by those of skill in the art. Furthermore, or alternatively, one or more of the functions described hereinafter with respect to the modules may be manually performed.

The memory 408 may be a computer-readable medium on which a control program is stored, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, RAM, ROM, PROM, EPROM, FLASH-EPROM, variants thereof, other memory chip or cartridge, or any other tangible medium from which the processor can read and execute. In this context, the systems described herein may be implemented on or as one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like.

The system 400 further includes one or more replaceable units 410 and 412, which are representative of components, consumables, or the like, that are capable of replacement to enable continued operation of the system 400. According to one embodiment of the subject application, the replaceable units 410 and 412 associated with the printer 402 and the scanner 404 may correspond to feed rollers, document handling rollers, automatic document feeding components, output media rollers, finishing components, fusing modules, and the like.

An operations counter module 416, and a fault code generator 418 are enabled by the processor 406, which are capable of being initiated at startup of the device 400, upon start of an operation to be performed by the scanner 404, the printer 402, or the like. The operations counter module 416, via the processor 406, facilitates the counting of operations, e.g., number of feeds, number of cycles, and the like, performed by or with the replaceable units 410 and 412. The number of operations performed by each replaceable unit 410 and 412 is then communicated to the life expectancy calculator 420. The memory 408 includes a life expectancy module 422 that stores information related to the life expectancy of each replaceable unit 410 and 412, i.e., the expected number of feeds, cycles, or other operations associated with the life of the corresponding replaceable unit 410 and 412. The life expectancy information from the module 422 is then communicated to the life expectancy calculator 420.

The life expectancy calculator 420 is operative to calculate a percentage of the life expectancy that has already been used, based upon the number of operations counted by the counter module 416 and the expected life of the replaceable unit 410 or 412 from the life expectancy module 422. A comparator 430 then compares the calculated rate with a threshold operations rate ($Th_O$) to determine, in conjunction with the processor 406, whether the replaceable unit 410 or 412 has met or exceeded a preselected percentage of its life expectancy. The threshold ($Th_O$) is representative of a predetermined number of operations, i.e., some or all of the life expectancy, associated with each particular replaceable unit 410 or 412. As the replaceable units 410 or 412 may have different life expectancies, i.e., a different number of cycles or feeds, the corresponding thresholds ($Th_O$) associated with the units 410 and 412 may be different.

According to one embodiment of the subject application, the threshold ($Th_O$) corresponds to a predetermined number of completed operations, such that meeting or exceeding the threshold ($Th_O$) indicates that replacement of the corresponding unit 410 or 412 is warranted, imminent, past due, or the like. The threshold operations rate ($Th_O$) may be stored in the life expectancy module 422 in association with the life expectancy of the replaceable unit 410 or 412 to which the rate ($Th_O$) corresponds. The output of the comparator 430 is then used by the processor 406 to initiate operations of the fault code calculator 432 as discussed in greater detail below.

The fault code generator 418 is operative, via the processor 406, to monitor operations of the system 400 and, using definitions of faults, e.g., errors, stored in the fault code definition module 424, identify fault codes associated with any errors detected during operations of the system 400. Fault codes generated by the generator 418 are used, by the processor 406, in conjunction with a fault code correlation module 426, to associate a generated code with a particular replaceable unit 410 or 412. It will be appreciated that such correlation is accomplished by the correlation module 426 using the fault code definitions 424, which include an indication as to the replaceable unit 410 or 412 associated with the generated fault code. The output of the correlation module 426, i.e., the fault code along with identification of the corresponding replaceable unit 410 or 412, is then communicated to the fault code history module 428.

When the fault code calculator 432 is initiated by the processor 406, i.e., based upon the output of the comparator 430 as set forth above, a running history from the fault code history 428 is analyzed so as to determine a fault code rate associated with a particular replaceable unit 410 or 412. The fault code calculator 432 calculates a percentage of the running history of fault codes that correspond to a particular replaceable unit 410 or 412. According to one embodiment, the running history may be set as the most recent 40, 50, 60, 100 or any desired number of faults generated by the fault generator 418.

The processor 406, via the comparator 430, then pulls a predetermined threshold fault rate ($Th_F$) from the fault code definitions 424 for comparison with the calculated percentage from the calculator 432. In accordance with one embodiment, the threshold ($Th_F$) is representative of a predetermined percentage of faults or errors indicative of replacement of the particular replaceable unit 410 or 412. According to such an embodiment, the threshold ($Th_F$) is set as a percentage of the running history of fault codes. The processor 406 may thus determine, based upon the output of the comparator 430, whether the calculated rate meets or exceeds the predetermined threshold fault rate ($Th_F$) associated with the particular replaceable unit 410 or 412.

When the calculated rate meets or exceeds the predetermined threshold fault rate ($Th_F$), the processor 406 initiates a notification module 434. According to one embodiment, the notification module 436 is operative to generate a notification indicating that the particular replaceable unit 410 or 412 requires replacement. The notification generated by the notification module 434 may be an alert displayed via the user interface 414, an electronic communication that is communicated in conjunction with the operations of a network module 436, or the like. In accordance with one embodiment, the notification module 434 generates a notification to a service provider (not shown) identifying the replaceable unit 410 or 412 via the network module 436. It will be appreciated that in accordance with such an embodiment, the notification module 434 may also be configured to place an order with such service provider for a new unit in advance of the failure of the identified replaceable unit 410 or 412, or in advance of a service call relating to the system 400.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for determining an end of life condition for at least one replaceable unit in a multifunction device comprising:

with a processor, initiating an operations counter associated with the at least one replaceable unit to generate a number of operations for the unit;

storing, in an associated memory, fault code occurrences generated by the multifunction device;

calculating a rate of fault code occurrences for the at least one replaceable unit;

comparing the calculated rate of fault code occurrences to a preselected fault code threshold in response to the number of operations relative to a preselected operations threshold;

determining the existence of an end of life condition for the at least one replaceable unit in accordance with the number of operations and a result of the comparison of the rate of the fault code occurrences for the replaceable unit; and generating a notification indicative of an end of life condition of the at least one replaceable unit.

2. The method of claim 1, further comprising comparing the number of operations for the replaceable unit to a preselected operations threshold, wherein the determination of an end of life condition further comprises determining the number of operations for the replaceable unit is greater than or equal to the preselected operations threshold.

3. The method of claim 2, wherein the determination of an end of life condition further comprises determining the calculated rate of fault code occurrences is greater than or equal to the preselected threshold fault rate.

4. The method of claim 3, wherein the replaceable unit is at least one of an automatic handler roll, a fuser module, or a paper feed roll.

5. The method of claim 3, wherein the rate of fault code occurrences of the at least one replaceable unit is calculated in accordance with a running history of stored fault codes associated with the multifunction device.

6. The method of claim 3, wherein the number of operations is at least one of a number of feeds or a number of cycles.

7. The method of claim 1, wherein generating a notification further comprises generating a request for a replacement of the at least one replaceable unit.

8. The method of claim 7, wherein the notification is at least one of an electronic mail message, a text message, an audible alert, or a visual alert.

9. A system for determining an end of life condition for at least one replaceable unit in a multifunction device comprising memory which stores instructions for performing the method of claim 1 and a processor for executing the instructions, the processor in communication with the memory storing the instructions.

10. A computer program product comprising a non-transitory recording medium storing instructions, which when executed by a computer causes the computer to perform the method of claim 1.

11. A replaceable unit premature end of life determination system, comprising:

a processor;

a counter operative to generate a number of operations associated with a replaceable unit;

a fault code generator operative to generate a number of fault codes generated during operations of an associated multifunction device; and memory that stores fault code definitions, the number of generated fault codes, and an output of the counter corresponding to the replaceable unit, wherein the memory is in communication with the processor, which stores instructions which are executed by the processor for:

calculating a rate of fault code occurrences generated by the fault code generator corresponding to the replaceable unit, comparing the number of operations for the replaceable unit to a preselected operations threshold, responsive to the comparison of the number of operations to the preselected operations threshold, comparing the calculated rate of fault code occurrences to a preselected fault code threshold, determining an end of life condition for the replaceable unit in response to the comparison of the calculated rate of fault code occurrences to the preselected fault code threshold, and generating a notification indicative of the end of life condition of the replaceable unit in accordance with the determination thereof.

12. The system of claim 11, wherein the replaceable unit is at least one of an automatic handler roll, a fuser module, or a paper feed roll.

13. The system of claim 11, wherein the rate of fault code occurrences of the replaceable unit is calculated in accordance with a running history of generated fault codes associated with the multifunction device.

14. The system of claim 11, wherein the number of operations is at least one of a number of feeds or a number of cycles.

15. The system of claim 11, wherein the memory further stores instructions for generating a request for a replacement of the replaceable unit.

16. The system of claim 11, wherein the notification is at least one of an electronic mail message, a text message, an audible alert, or a visual alert.

17. A computer-implemented method for determining a premature end of life condition for at least one replaceable unit of an associated multifunction device comprising:

with a processor, initiating an operations counter associated with the at least one replaceable unit to generate a number of operations for the unit;

storing, in an associated memory, fault code occurrences generated by the multifunction device;

calculating a rate of fault code occurrences for the at least one replaceable unit in a running history of stored fault codes;

comparing the number of operations for the at least one replaceable unit to a preselected operations threshold;

comparing the calculated rate of fault code occurrences to a preselected fault code threshold in response to an output of the comparison of the number of operations to the preselected operations threshold;

determining an end of life condition for the at least one replaceable unit in response to the comparison of the calculated rate of fault code occurrences to the preselected fault code threshold; and generating a notification indicative of the end of life condition for the at least one replaceable unit in accordance with the determination thereof.

18. The method of claim 17, wherein the output of the operations threshold comparison corresponds to determining the number of operations for the replaceable unit is greater than or equal to the preselected operations threshold, and wherein the determination of an end of life condition further comprises determining the calculated rate of fault code occurrences is greater than or equal to the preselected threshold fault rate.

19. The method of claim 18, wherein the number of operations is at least one of a number of feeds or a number of cycles.

20. The method of claim 19, wherein generating a notification further comprises generating a request for a replacement of the at least one replaceable unit.

* * * * *